April 2, 1946. W. G. WEHR 2,397,896
SHEAR PRESS
Filed April 21, 1944 6 Sheets-Sheet 4

INVENTOR.
WILLIAM G. WEHR
BY
Kwis Hudson Boughton & Williams
ATTORNEYS

INVENTOR.
WILLIAM G. WEHR

April 2, 1946.  W. G. WEHR  2,397,896
SHEAR PRESS
Filed April 21, 1944  6 Sheets-Sheet 6

INVENTOR.
WILLIAM G. WEHR
BY
Kwis Hudson, Boughton & Williams
ATTORNEYS

Patented Apr. 2, 1946

2,397,896

UNITED STATES PATENT OFFICE 2,397,896

SHEAR PRESS

William G. Wehr, North Madison, Ohio, assignor to The Cleveland Crane & Engineering Company, Wickliffe, Ohio, a corporation of Ohio Application April 21, 1944, Serial No. 532,078

30 Claims. (Cl. 164—43)

The present invention relates to metal working machines and more particularly to power operated heavy duty shear presses especially designed and adapted for shearing metal plates and the like.

The principal object of the invention is the provision of a novel and improved power operated shear press of the general type employed in shops engaged in fabricating metal plates and the like which shear will be simple and rugged in construction, comparatively light in weight, and wherein the shearing operation will be effected in a novel manner.

Another object of the invention is the provision of a novel and improved power operated shear press of the type referred to wherein the relative movement between the shearing knives is effected by moving or oscillating a blade carrying one of the shearing knives about an axis generally parallel with the length of the cutting edge of the other shearing knife which is supported by the bed, as distinguished from the customary construction wherein the relative movement between the shearing knives is effected by moving or reciprocating a shearing knife carrying blade in a linear direction or by oscillating a shearing knife carrying blade about an axis extending in a direction at right angles to the length of the blades.

Other objects of the invention are the provision of a novel and improved power operated shear press of the character referred to comprising novel and improved means for readily adjusting the blade toward and from the bed, so as to better accommodate different thicknesses of work; novel and improved hold-down mechanism; and novel and improved operating mechanism, etc; and novel and improved means for adjusting the shear press for slitting operations.

The invention resides in certain constructions, combinations and arrangements of parts and further objects and advantages thereof will be apparent to those skilled in the art to which it relates from the following description of the preferred embodiment thereof described with reference to the accompanying drawings forming a part of this specification, in which similar reference characters designate corresponding parts throughout the several views, and in which Fig. 1 is a front elevational view of a power operated shear embodying the present invention;

Figure 1:
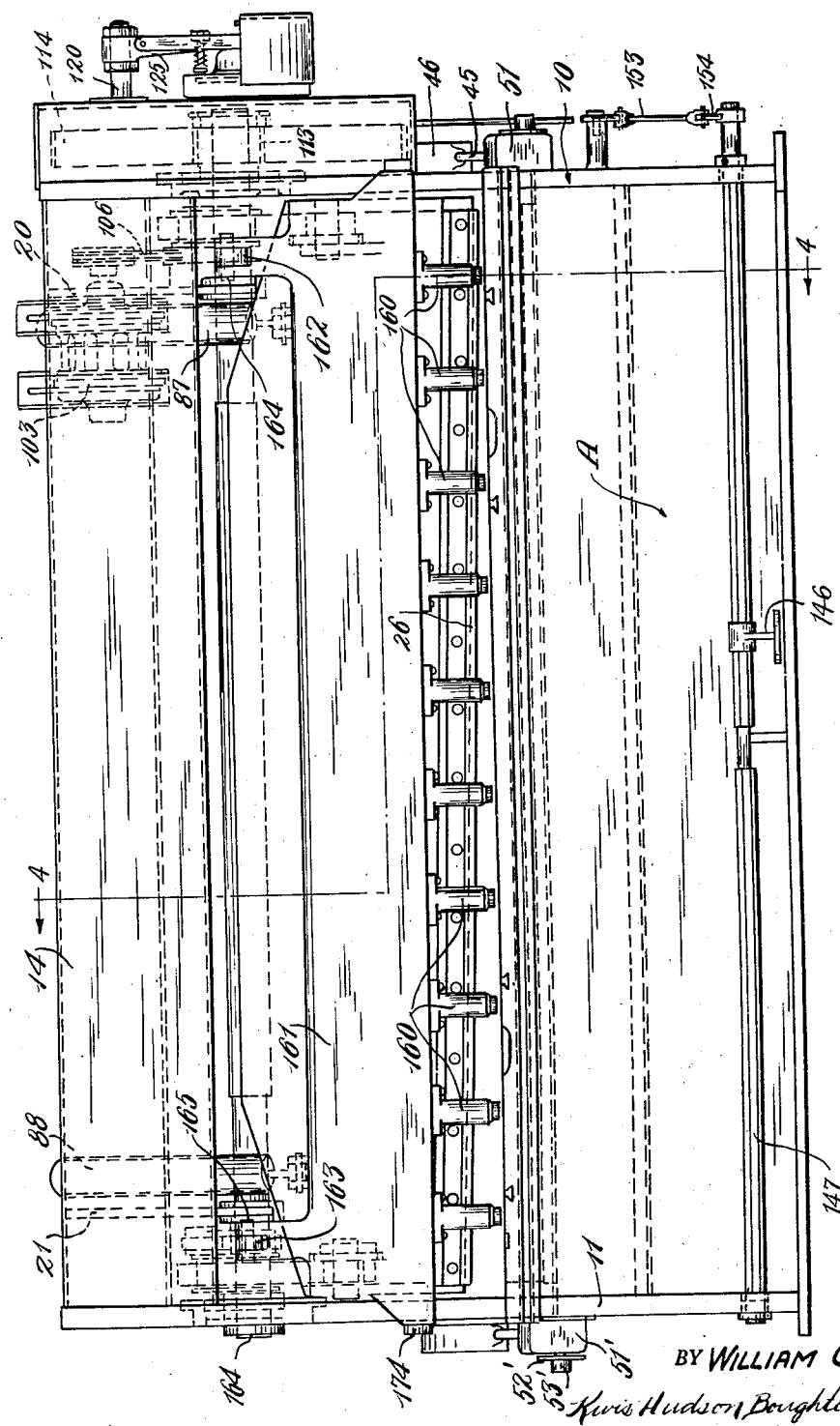

As previously stated, the present invention relates to a power operated shear press of novel and improved construction and wherein the relative movement between the shearing knives is effected by oscillating a shearing knife carrying blade about an axis extending in a direction generally parallel to the length of the shearing knives as distinguished from constructions wherein the relative movement between the shearing knives is effected by reciprocating one of the shearing knives in a straight line direction or by oscillating one of the shearing knives about an axis extending in a direction transverse to the length of the shearing knives. The latter design is generally referred to as an "alligator" type shear.

Referring to the drawings, the reference character A designates a frame, which frame comprises stress resisting plate like end members or side housings 10 and 11 having aligned openings 12 and 13, respectively, in their front edges; a crown 14; and a bed, designated generally by the reference character C, comprising plate-like members 15, 16 and 17, the latter of which forms a scrap chute. The stress resisting end members or side housings are connected together by the members 14, 15, 16 and 17, opposite ends of which are welded thereto. The upper or crown member 14 is generally box shaped in cross-section as clearly shown in Fig. 4 and opposite ends thereof are welded to the side members 10 and 11 adjacent to their front upper edges. Web members 20, 21 and 22 welded to the interior of the member 14 reinforce the same. The lower ends of the web members 22 and 21 extend below the rear side of the member 14 and form a support for a crankshaft 23, hereinafter more specifically referred to. The longitudinal vertical member 15 is located immediately to the rear of and welded to the horizontal member 16, which member in addition to reinforcing the upper edge of the member 15 forms the support or table for the work. The member 17 which is located behind and welded to the member 15 makes an angle of about 45° with the member 15 and slopes downwardly towards the rear of the machine, thus forming with the members 15 and 16 a very rigid but comparatively light bed structure.

The shearing operation is performed by a shearing knife 24 located in a cut-out portion 25 at the upper rear corner of the bed C and a shearing knife 26 connected to the lower front end of a movable ram or blade, designated generally by the reference character B. The lower shearing knife 24 is adjustably secured in the cut-out portion 25 of the bed member 15 by a plurality of bolts or screws 27 projecting through vertically elongated holes therein and threaded into suitably tapped holes in the member 15. The heads of the bolts 27 are countersunk into the rear side of the shearing knife 24 so as not to interfere with the movement of the upper shearing knife 26 or material sheared thereby. The shearing knife 24 is adapted to be adjusted vertically by a gib bar 28 extending the entire length of the shearing knife and interposed between the bottom or lower side of the shearing knife and the rearwardly inclined surface 30 of the cut-out portion 25 of the bed member 15. The lower surface of the gib 28 is inclined to cooperate with the inclined surface 30 of the bed member 15. The gib is held in position and adapted to be adjusted towards and from the bed member 15 by a plurality of screws 31 projecting through vertically elongated slots therein and threaded into tapped holes in the bed member 15. The shearing knife 24 is adapted to be adjusted horizontally with respect to its supporting member by shims or the like interposed therebetween and the bed member 15. Alternatively other means may be provided for adjusting the blade if desired.

The movable ram or upper blade B is of built-up construction and comprises a longitudinally extending front plate 32 welded to rearwardly projecting end members 33 and 34, the rear ends of which are rotatably connected to short shaft-like members 35 and 36 rotatably supported in suitable apertures in the side housings 10 and 11, respectively, for pivotal movement about axes eccentric to the axis about which the end members 33 and 34 are connected thereto. The eccentric relationship between the axes about which the end members 33 and 34 of the movable ram or leaf B are pivotally connected to the shafts 35 and 36 and the axes about which the shafts 35 and 36 are in turn rotatably supported in the side housings 10 and 11 permits the blade B and in turn the shearing knife 26 carried thereby to be adjusted closer to or farther from the shearing knife 24 carried by the bed C upon rotation of the shafts 35 and 36. This construction provides means for adjusting the shearing knife 26 towards and from the shearing knife 24 in a horizontal plane, as viewed in the drawings, to adjust the clearance between the shearing knives for the shearing of material or sheets of different thickness. In the embodiment shown, provision is made for adjusting or rotating the shafts 35 and 36 simultaneously, however, other means may be provided if desired.

Figure 7:
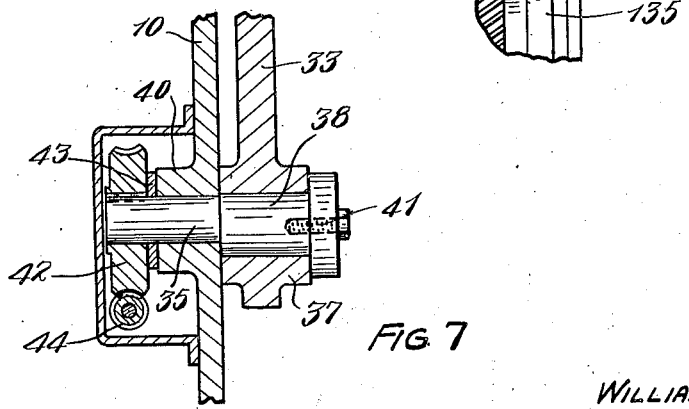
Fig. 7 is a sectional view approximately on the line 7—7 of Fig. 2.

The manner in which the end member 34 is rotatably connected to the shaft 36 and the manner in which the shaft 36 is in turn rotatably supported in the side housing 11 and adjusted or rotated therein is identical in construction with the manner in which the member 33 is rotatably connected to the shaft 35, etc., and only the latter is shown in detail and described. The corresponding parts of the former which show on the drawings are indicated by similar reference characters with a prime mark affixed thereto. Referring to Fig. 7 it will be seen that the rear end of the member 33 is provided with an enlarged boss 37 rotatably supported on the eccentric 38 formed integral with the shaft 35, which shaft is in turn rotatably supported in a boss 40 formed integral with or welded to the side housing 10. The parts are held in assembled relationship by a disk 41 bolted to the right-hand end of the shaft 35 and by a worm gear 42 keyed to the left-hand end of the shaft. A wear plate 43 is interposed between the left-hand end of the boss 40 and the worm gear 42. The worm gear 42 is continuously in mesh with a worm 44 fixed to the rear end of a shaft 45 rotatably supported in a bracket 46, which bracket is bolted to the side housing 10 and forms a housing for the worm and worm gear.

Figure 2:
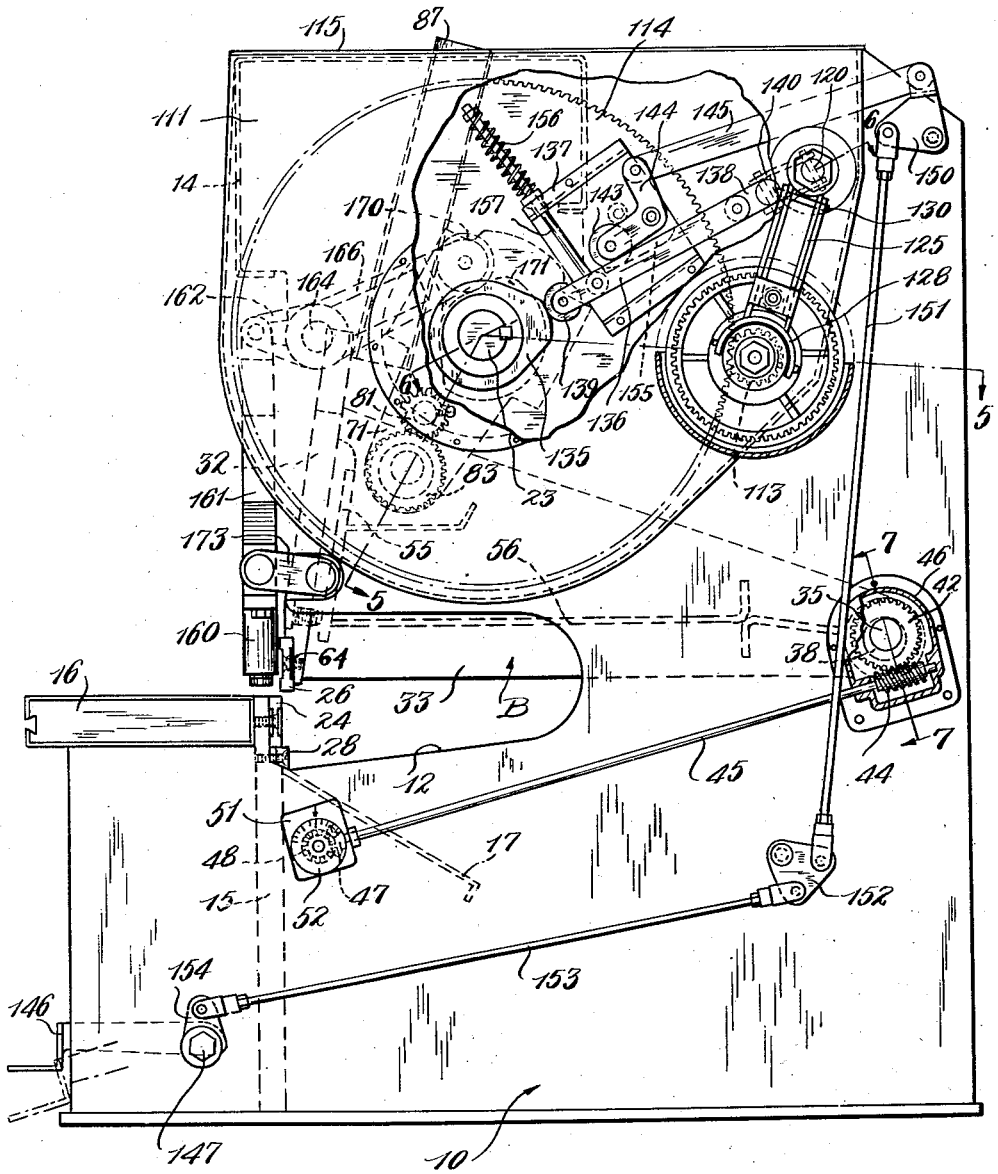
Fig. 2 is an end view of the shear shown in Fig. 1 looking from the right.
Figure 3:
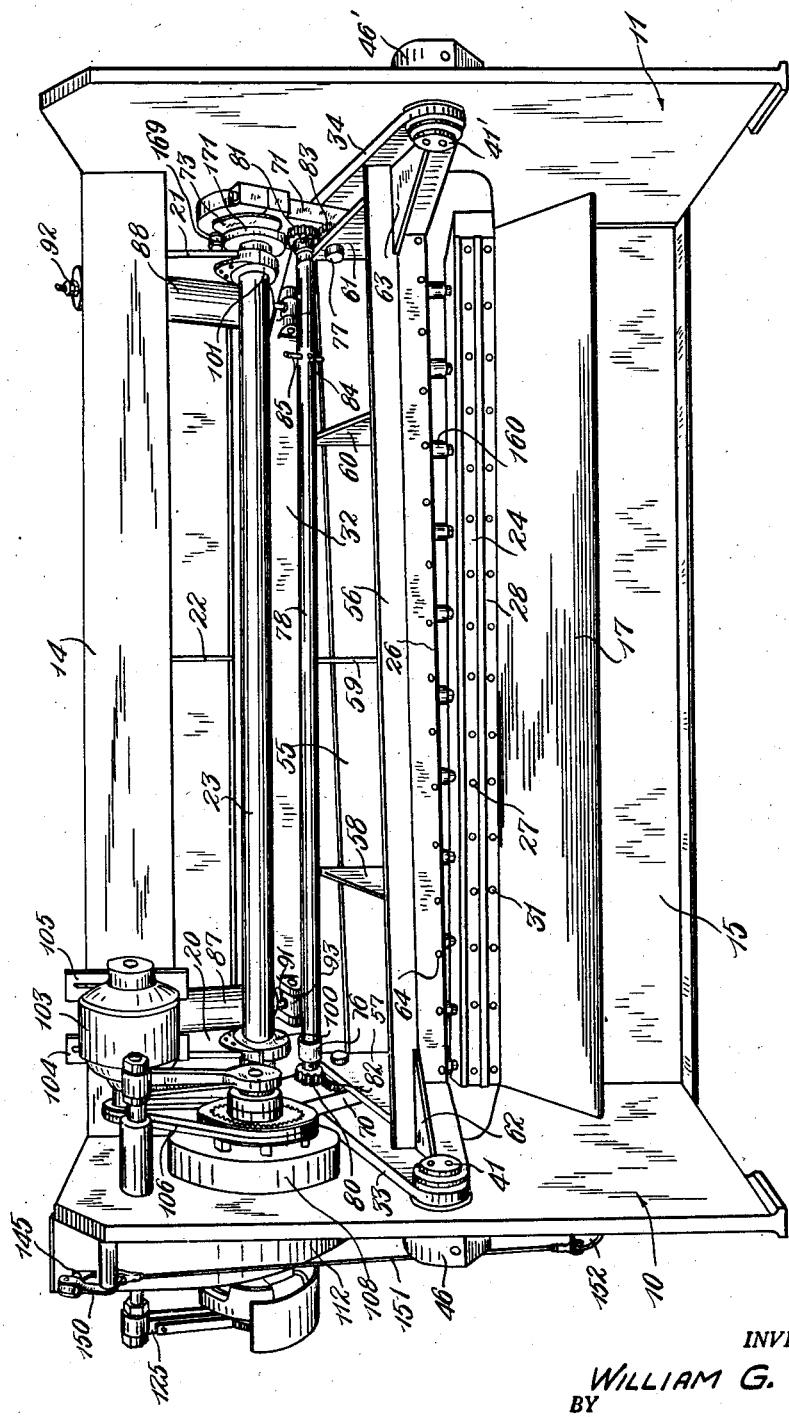
Fig. 3 is a rear view of the shear shown in Fig. 1.
Figure 4:
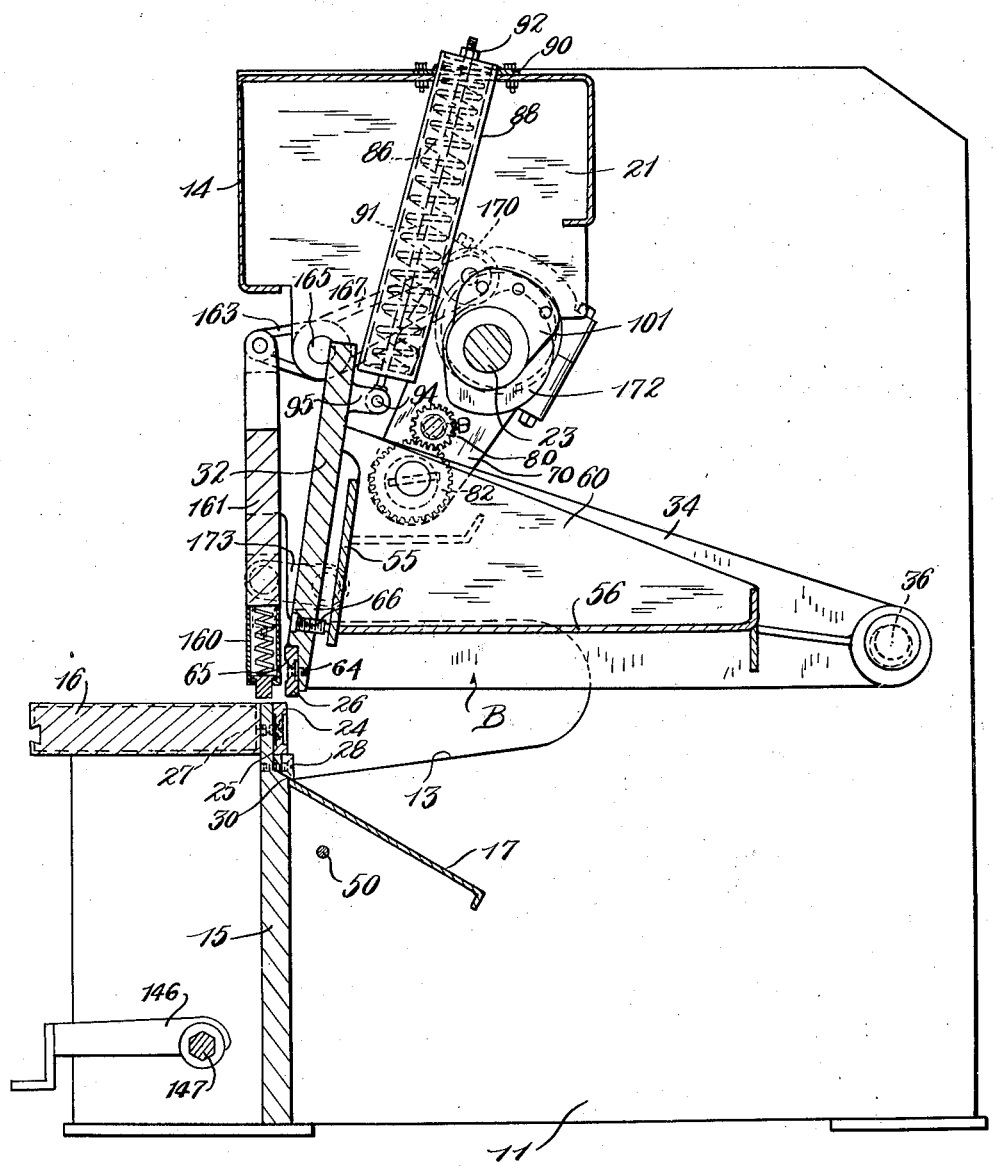
Fig. 4 is a sectional view approximately on the line 4—4 of Fig. 1.

The shaft 45 extends towards the front of the press and the forward end thereof is provided with a bevel gear 47 in mesh with a bevel gear 48 fixed to the right-hand end of a shaft 50 rotatably supported in the side housings 10 and 11 and extending across the frame underneath the plate 17 and to the rear of the bed plate 15, see Figs. 2 and 4. The forward end of the shaft 45 is rotatably supported in a housing 51 bolted to the side housing 10, which housing 51 in addition to forming a support for the shaft 45 encloses the bevel gears 47 and 48. The shaft extends beyond the housings 51, 51' and exterior of the housings is provided with a dial 52 and some form of operating means, which may be either a knurled knob 53 or a driving connection adapted to receive a hand crank or the like. As previously stated, both ends of the shear are identical in construction insofar as the support for the rear ends of the end members 33 and 34 of the movable ram B and the means for adjusting the same are concerned, from which it follows that with the construction described above, the shafts 35 and 36 can be simultaneously rotated from either end of the shear to adjust or set the shear for shearing material of different thickness. The dials 52, 52' are preferably provided with indicia and the housings 51, 51' with reference lines to facilitate the adjustment or setting up of the shear.

Other means may be employed, if desired, for adjusting the knife clearance, for example, the pivots for the blade B may be moved bodily toward and from the bed C. Alternatively adjustable eccentric bushings may be connected to the end members 33, 34 similar to the adjustable eccentric bushings employed in the pitmans for reciprocating the blade, which bushings, etc., are hereinafter described in detail.

In addition to the front plate 32 and the end members or plates 33 and 34 the upper blade or ram B comprises a plate 55 extending between and welded to the end members 33 and 34 and a bottom plate 56 having an upwardly extending rear flange. The plate 55 is located to the rear of the plate 32, is parallel therewith, and spaced slightly therefrom. The front edge of the bottom plate 56 abuts against and is welded to the rear side of the plate 55 adjacent to the lower edge thereof and the ends of the bottom plate are welded to the end members 33 and 34. The blade assembly is reinforced by web members 57, 58, 59, 60 and 61 welded to the front plates 32 and 55 and to the bottom plate 56 and by triangular plates 62 and 63 welded to the rear side of the bottom plate 56 and the end members 33 and 34.

The front plate 32 of the blade B is inclined at a slight angle to the vertical, as shown in Figs. 2 and 4, and the lower front edge of the plate 32 is cut out to receive the shearing knife 26, which shearing knife is held in position therein by a plurality of screws 64 projecting therethrough and threaded into tapped apertures in the plate 32. The heads of the screws 64 are located in a groove 65 in the front face of the shearing knife 26 and are countersunk so as not to interfere with the operation of the device. The center of the shearing knife 26 is adapted to be adjusted horizontally towards and from the shearing knife 24 to provide uniform knife clearance by a plurality of screws or studs 66 threaded into the plate 32 and adapted to engage the face of the plate 55 opposite the place where the plate 56 is welded thereto. The heads of the screws or studs 66 are countersunk and accessible from the front of the machine. The fact that the lower edges of the plate 32 are unsupported between the end plates or members 33 and 34 permits the same to be sprung by the screws 66 to camber the knife 26 and obtain uniform knife clearance.

The front end of the ram or movable blade B is supported and the entire assembly adapted to be oscillated about the shafts 35 and 36 by pitmans 70 and 71 including eccentrics 74, only one of which is shown in the drawings. The pitmans are operatively connected to eccentrics 72 and 73 keyed to the crankshaft 23 and to short shafts 76 and 77 fixed in opposite ends of the blade B. As shown, the shafts 76 and 77 are supported in suitable aligned apertures in the end members 33 and 34 and the web members 57 and 61 adjacent thereto. The eccentrics 74 which are rotatably supported in the lower end of the pitmans and surround the shafts 76 and 77 are adapted to be simultaneously rotated to adjust the blade B relative to the pitmans 70 and 71 by a shaft 78 rotatably supported in suitable apertures in the pitmans. Opposite ends of the shaft 78 are provided with small gears 80 and 81 adjustably secured thereto as by thumb screws, which gears are continuously in mesh with small gears 82 and 83 formed integral with the eccentrics 74. Any suitable means may be provided for rotating the shaft 78. As shown the shaft is provided with a plurality of apertures 84 extending therethrough adapted to receive a hand lever or tool in the form of a rod 85 through the medium of which it may be manually rotated. This adjustment provides means for converting the machine from a through shear to a splitting shear or vice versa.

In the preferred embodiment shown, the weight of the movable blade assembly B is counterbalanced by compression springs 86, one at either end of the ram, located within the tubular members 87 and 88 fixed to the crown member 14. As shown the upper ends of the tubular members are welded to disk-like plates 90 bolted to the top of the crown member 14 and project downwardly through suitable apertures therein. This construction permits ready assembly and disassembly of the various parts involved. The lower ends of the tubular members 87 and 88 are closed and the springs 86 are interposed therebetween and washer-like members adjustably secured to the upper ends of rods 91 by nuts 92. The lower ends of the rods 91 are welded to tubular members 93 rotatably connected to short shafts fixed in brackets 95 welded to the front plate 32 of the movable blade assembly.

The crankshaft 23 is rotatably supported in bearings 100 and 101 detachably bolted to the lower ends of the web members 20 and 21 and by a bearing 102 where it projects through the side housing 10. The crankshaft is adapted to be driven by an electric motor 103 bolted to plates 104 and 105 welded to the crown member 14. The rotor shaft of the motor 103 is connected by a flexible drive connection, designated generally as 106, to a wheel 107 fixed to a flywheel 108 rotatably supported on a shaft 110, which shaft is in turn rotatably supported in suitable bearings fixed to the side housing 10 and to a plate 111 spaced therefrom but connected thereto by an irregularly-shaped plate 112 interposed therebetween and the side housing 10. The plates just mentioned form an enclosure or compartment on the outside of the side housing 10 which houses mechanism, hereinafter more specifically referred to, which mechanism includes a pinion gear 113 keyed to the shaft 110 and in mesh with a large gear 114 keyed to the end of the crankshaft 23. The compartment formed by the members 10, 111 and 112 is closed by a removable cover 115 bolted to the top thereof.

Figure 5:
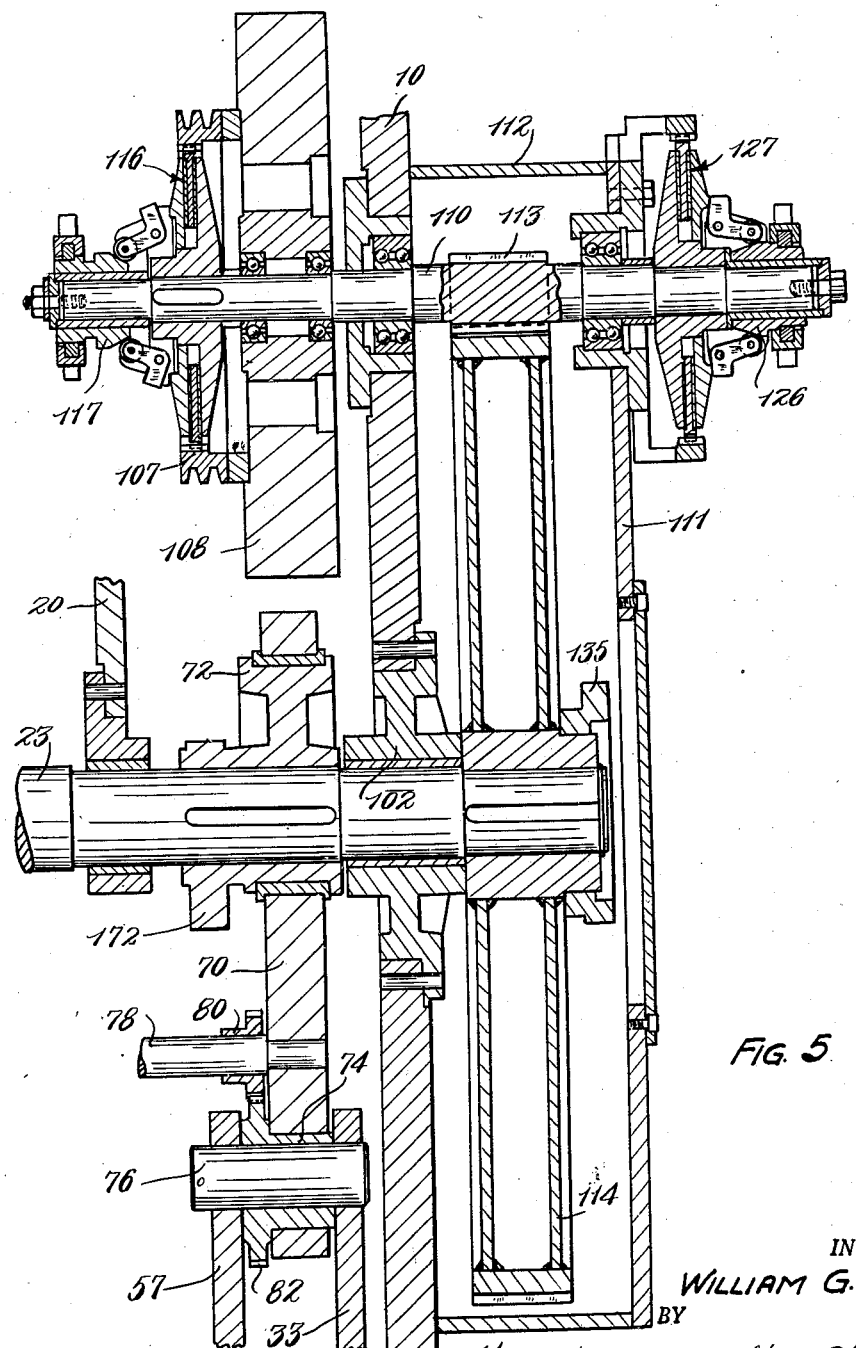
Fig. 5 is a sectional view approximately on the line 5—5 of Fig. 2.

The flywheel 108 is adapted to be connected and disconnected with the shaft 110 by which the crankshaft 23 is rotated and the movable blade B oscillated, by a friction disk clutch, designated generally by the reference character 116, the particular construction of which clutch forms no part of the present invention. Suffice it to say that the driving member of the clutch is adapted to be clamped between relatively movable driven members by a clutch operating member 117 slidably supported on the left-hand end of the shaft 110, see Fig. 5, and adapted to be reciprocated therealong by a yoke member 118 fixed to the left-hand end of a rod 120, see Fig. 6. The rod 120 is slidably supported by a tubular member 121 fixed in a suitable aperture in the member 10 and by a disk-like member 122 fixed in a suitable aperture in the plate 111 and is continuously urged towards the right, as viewed in Fig. 6, that is in a direction to engage the clutch 116 by a compression spring 123 surrounding the same and located within the tubular member 121. The left-hand end of the compression spring 123 engages the closed end of the tubular member 121 and the other end thereof engages a collar 124 detachably connected to the rod 120.

The opposite end of the rod 120 is provided with a two-part yoke member 125, the lower end of which is connected to a brake operating member 126. The brake operating member 126 is similar to the clutch operating member 117 and the construction is such that when the clutch 116 is disengaged by movement of the rod 120 towards the left, as viewed in Fig. 6, a disk-type brake, designated generally as 127, is applied by the member 126.

Figure 6:
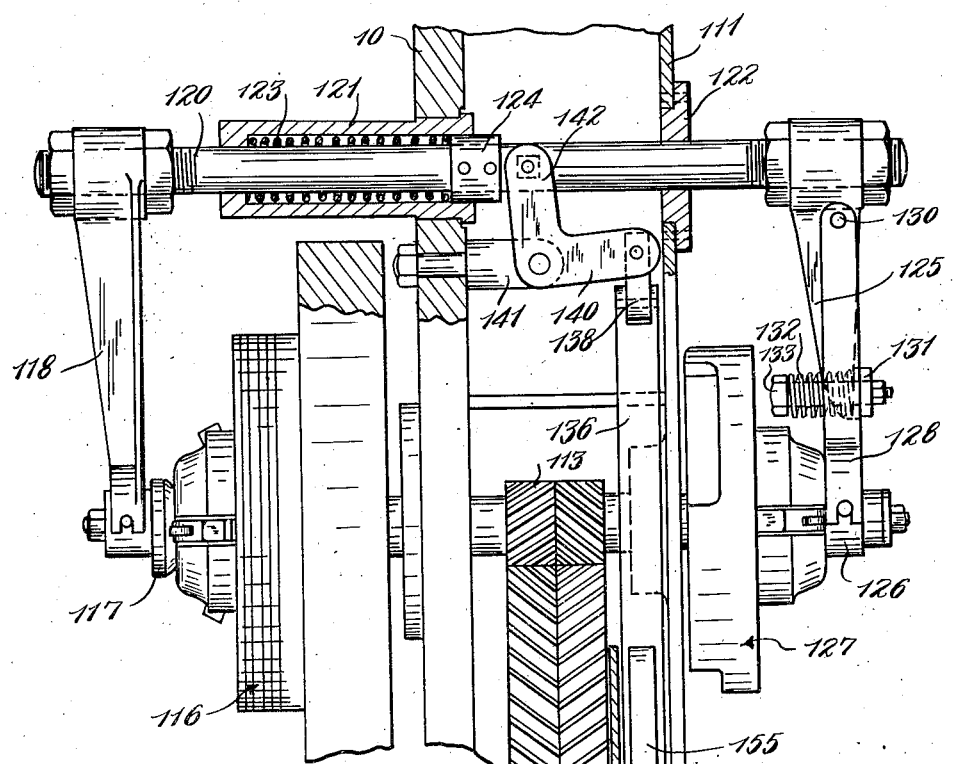
Fig. 6 is a sectional view approximately on the line 6—6 of Fig. 2.

The construction of the two-part yoke member 125 is such to permit limited movement of the rod 120 after the brake 127 is applied. The particular construction employed also permits the force with which the brake is applied to be readily regulated. Referring particularly to Figs. 2 and 6, the lower part 128 of the yoke 125 is pivotally connected to the upper part by a pin 130. Rotation of the part 128 about its pivot 130 in a clockwise direction as viewed in Fig. 6 is limited by a cross member 131 and the two parts are normally held in engaged position by a compression spring 132 surrounding a bolt 133 projecting through aligned apertures in the cross member 131 and in the lower end of the upper part of the yoke member. The compression spring 132 is interposed between the head of the bolt 133 and the lower end of the upper part of the yoke member 125. The construction is such that continued movement of the rod 120 after the brake is applied causes a slight rotation of the member 128 about its pivot 130 against the action of the spring 132, which spring in turn controls the force with which the brake is applied. This force can be readily varied by adjusting the length of the bolt 133.

The rod 120 is adapted to be shifted towards the right, as viewed in Fig. 6, to release the brake 127 and engage the clutch 116 by a cam 135 fixed to the hub of the gear 114, which cam is adapted to reciprocate a bar 136 slidably supported between the plate 111 and a bracket 137 bolted thereto. The lower or left-hand end of the bar 136, as viewed in Fig. 2, is provided with a roller 139 which engages the cam 135 and the right-hand end thereof is pivotally connected to a member 138 for rotation about a horizontal axis. The member 138 is in turn pivotally connected to one arm of the bell crank lever 140 for movement about a more or less vertical axis. The bell crank lever 140 is pivotally connected to a bracket 141 fixed to the member 10 and the other arm 142 thereof is pivotally connected to the rod 120. The construction is such that reciprocation of the rod 136 produces linear movement of the rod 120 and vice versa.

Normally the roller 139 on the lower end of the bar 136 rides on the high part of the cam 135 and maintains the rod 120 in its left-hand position as viewed in Fig. 6 with the clutch 116 disengaged and the brake 127 applied. The roller 139 is adapted to be moved in a downward direction away from the high part of the cam 135 by a roller 143 carried by one arm of a bell crank lever 144 pivotally connected to the bracket 137, the other arm of which is pivotally connected to a link 145 operatively connected by a plurality of bell crank levers and links to a treadle 146 carried on a hexagonal shaft 147 extending along the front of the machine underneath the member 16 and adjacent to the floor. The treadle 146 is slidable along the shaft 147 so that it can be moved to any convenient location along the front of the shear. As shown, the mechanism for connecting the link 145 with the shaft 147 comprises a bell crank lever 150 pivotally connected to the member 10 adjacent to the top thereof to which lever the link 145 is connected, a link 151 pivotally connected to the bell crank lever 150 and to a bell crank lever 152 connected to the end member 10 near the floor, and a link 153 connected to the bell crank lever 152 and to a lever 154 fixed to the end of the shaft 147, however, any suitable alternative construction may be employed. The roller 143 engages within a groove 155 in the upper side of the bar 136 and the bar 136 is yieldably urged into engagement therewith by a compression spring 156 surrounding a rod 157 pivotally connected to the bar 136 and projecting through the upper side of the bracket 137. The compression spring 156 is interposed between the bracket 137 and an adjustable nut on the upper end of the rod 157.

The construction of the mechanism just described is such that when the treadle 146 is depressed the bell crank lever 144 is rotated about its pivot in a counterclockwise direction forcing the bar 136 downward until the roller 139 rides off the high part of the cam 135 whereupon the bar 136 and in turn the rod 120 are moved by the spring 123 in a direction to disengage the brake 127 and engage the clutch 116. The engagement of the clutch 116 causes the shaft 110 to rotate which in turn rotates the crankshaft 23, oscillating the movable blade B. The crankshaft is rotated in a counterclockwise direction as viewed in Figs. 2 and 4 and immediately upon the high part of the cam moving away from the roller 139, the bar 136 returns to its normal upper position under the action of the spring 156. As the crankshaft completes one revolution, the roller 139 travels up the high part of the cam 135 shifting the bar 136 and the rod 120 against the action of the spring 123 to a position where the clutch 116 is disengaged and the brake 127 engaged, thus one complete oscillation of the movable blade B is automatically effected each time the treadle 146 is depressed and immediately released.

The shear, as shown, is also preferably provided with a plurality of spring-loaded hold-down devices 160 detachably connected to the lower edge of a hold-down plate 161 opposite ends of which are suspended from the forward arms 162 and 163 of bell crank levers pivotally supported on short shafts 164 and 165 carried by the plates 20 and 21. The rear arms 166 and 167 of the bell crank levers referred to are provided with rollers 169 and 170 which engage suitable cams 171 and 172 formed integral with the eccentrics 72 and 73. The bell crank levers are continuously urged in a clockwise direction, as viewed in Figs. 2 and 4, to maintain the rollers 169 and 170 in contact with the cams 171 and 172 by suitable spring means, not shown. Opposite ends of the hold-down plate 161 are pivotally connected to the members 10 and 11 by links 173 and 174 pivotally connected to the studs carried by the ends of the hold-down plate 161 and the members 10 and 11, respectively.

As compared with commercial shears of like capacity, the shear of the present invention is of considerably less height. This is quite an advantage in many respects especially where it is desirable to move the material over the shear, as is often the case. Attention is called to the fact that in the preferred construction shown, the center lines of the pitmans 70 and 71 which effect the oscillation of the movable ram or blade B when extended intersect or substantially intersect the cutting edge of the lower shearing knife 24, thus the force applied to the blade B is applied in a direction which tends to oppose the forces tending to separate the shearing knives during the shearing operation. Most of the thrust tending to separate the shearing knives during the shearing operation is resisted by the pitmans 70 and 71 while the remainder thereof is resisted by the pivots or shafts 35 and 36.

As shown, the axis about which the movable ram or blade B is rotated is located slightly above the plane of the top of the bed C or the horizontal plane of the rear upper edge of the bed C and the cutting edge of the lower shearing knife 24, the upper shearing knife 26 is inclined upward towards the left as viewed in Fig. 1, as is the usual practice, and a friction clutch is employed to operate the device. Attention is further called to the fact that the shear of the present invention is free from guides which wear and are otherwise objectionable. Any wear on the pivots or shafts 35 and 36 can be readily compensated for in the present instance by merely rotating the gears 42 and 42'. In fact for purposes of setting up the machine and compensating for wear, etc., the bevel gears 41 and 41', as shown, are adjustably connected to the shafts 45 and 45', respectively, and are adapted to be secured to their respective shafts in any adjusted position by set screws of conventional construction.

From the foregoing description of the preferred embodiment of the invention, it will be apparent that the objects heretofore enumerated and others have been accomplished and that a new and improved shear has been provided. While the preferred embodiment of the invention has been described in considerable detail, the invention is not limited to the particular construction shown, which construction may be varied within the scope of this invention and it is my intention to hereby cover all adaptations, modifications and uses thereof which come within the practice of those skilled in the art to which the invention relates and within the scope of the appended claims.

Having thus described my invention, what I claim is:

1. In a shear of the character referred to, the combination of: a frame comprising vertically positioned horizontally spaced stress resisting side housings and a bed connecting said side housings adjacent to the front thereof; said bed being adapted to support a shearing knife adjacent to the upper rear edge thereof; a movable generally horizontal ram or blade located intermediate said side housings and extending substantially the entire distance therebetween; said movable ram or blade being adapted to carry a shearing knife affixed to the lower front edge thereof and adapted to cooperate with the shearing knife supported by said bed; means for pivotally supporting the rear end of said ram or blade in said frame for movement about an axis generally parallel with the upper rear edge of said bed; a crankshaft rotatably supported in said frame; power actuated means including a friction clutch for rotating said crankshaft; and a plurality of pitmans operatively connected to said crankshaft and to said ram or blade adjacent to the front end thereof for oscillating the same.

2. In a shear of the character referred to, the combination of: a frame comprising vertically positioned horizontally spaced stress resisting side housings and a bed connected to said side housings adjacent to the front thereof, said bed being adapted to support a shearing knife adjacent to the upper rear edge thereof; a movable ram or blade adapted to support a shearing knife adjacent to the lower front side thereof; means for supporting said movable ram or blade in said frame for movement towards and from said bed; and means including a friction clutch for moving said movable ram or blade.

3. In a shear of the character referred to, the combination of: a frame comprising vertically positioned horizontally spaced stress resisting side housings and a bed connected to said side housings adjacent to the front thereof, said bed being adapted to support a shearing blade adjacent to its front rear edge; a movable ram or blade adapted to support a shearing knife adjacent to its lower front edge for cooperation with the shearing blade supported by said bed; means for supporting said movable ram or blade in said frame for movement towards and from said bed; a crankshaft rotatably supported in said frame; pitmans operatively connected to said movable ram or blade and to said crankshaft; an electric motor; and means including a friction clutch for operatively connecting and disconnecting said electric motor and said crankshaft.

4. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said side housings for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; and power actuated means pivotally connected to said ram or blade adjacent to the front thereof for oscillating said ram or blade about said axis to cause a cutting edge of the shearing knife carried thereby to move across the cutting edge of the shearing knife carried by said bed.

5. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said side housings for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; means for moving said ram or blade in a generally horizontal direction whereby the clearance between the shearing knife carried thereby and the shearing knife carried by said bed may be varied; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

6. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said side housings for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; means for moving the axis about which said ram or blade is pivotally supported toward and from said bed whereby the clearance between the shearing knife carried thereby and the shearing knife carried by said bed may be varied; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

7. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of eccentric members for pivotally supporting said movable ram or blade in said side housings for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; means for moving said eccentric members whereby the clearance between the shearing knife carried by said ram or blade and the shearing knife carried by said bed may be varied; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

8. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of eccentric members for pivotally supporting said movable ram or blade in said side housings for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; common means for simultaneously moving said eccentric members whereby the clearance between the shearing knife carried by said ram or blade and the shearing knife carried by said bed may be varied; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

9. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of eccentric members for pivotally supporting said movable ram or blade in said side housings for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; means for simultaneously rotating said eccentric members whereby the clearance between the shearing knife carried by said ram or blade and the shearing knife carried by said bed may be varied; means operatively connected to said ram or blade for indicating the position of said ram or blade horizontally of said bed; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

10. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of pivots eccentrically mounted in said side housings for pivotally supporting said movable ram or blade for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; means for rotating said pivots whereby the clearance between the shearing knife carried thereby and the shearing knife carried by said bed may be varied; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

11. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of pivots eccentrically supported by said side housing for pivotally supporting said movable ram or blade for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; means common to said pivots for simultaneously rotating said pivots whereby the clearance between the shearing knife carried by said ram or blade and the shearing knife carried by said bed may be varied; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

12. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of pivots eccentrically supported by said side housing for pivotally supporting said movable ram or blade for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; means common to said pivots for simultaneously rotating said pivots whereby the clearance between the shearing knife carried by said ram or blade and the shearing knife carried by said bed may be varied; said last mentioned means including indicia for indicating the position of said ram or blade; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

13. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said side housings for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; and power actuated means including a member pivotally connected to said ram or blade adjacent to the front thereof for oscillating said ram or blade about said axis to cause a cutting edge of the shearing knife carried thereby to move across the cutting edge of the shearing knife carried by said bed; said member being adapted to apply the force exerted thereby to said ram or blade in such a manner that it has a component in a direction radially outwardly of said axis.

14. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame; power actuated means operatively connected to said crankshaft for rotating said crankshaft; and a plurality of pitmans operatively connected to said crankshaft and to said ram or blade adjacent to the front thereof for oscillating said ram or blade about said axis to cause a cutting edge of the shearing knife carried thereby to move across the cutting edge of the shearing knife carried by said bed.

15. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame to the rear of and above the upper rear edge of said bed; power actuated means operatively connected to said crankshaft for rotating said crankshaft; and a plurality of pitmans operatively connected to said crankshaft and to said ram or blade adjacent to the front end thereof for oscillating said ram or blade about said axis to cause a cutting edge of the shearing knife carried thereby to move across the cutting edge of the shearing knife carried by said bed.

16. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame; power actuated means operatively connected to said crankshaft for rotating said crankshaft; and a plurality of pitmans operatively connected to said crankshaft and to said ram or blade below and forward of said crankshaft for oscillating said ram or blade about said axis to cause a cutting edge of the shearing knife carried thereby to move across the cutting edge of the shearing knife carried by said bed.

17. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame to the rear of and above the upper rear edge of said bed; power actuated means operatively connected to said crankshaft for rotating said crankshaft; and a plurality of pitmans operatively connected to said crankshaft and to said ram or blade adjacent to the front thereof for oscillating said ram or blade about said axis to cause a cutting edge of the shearing knife carried thereby to move across the cutting edge of the shearing knife carried by said bed; said pitmans being connected to said ram or blade at such points that the extended centerlines thereof substantially intersect the upper rear edge of said bed as the cutting edge of the shearing knife carried by said ram or blade moves across the cutting edge of the shearing knife carried by said bed.

18. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame; power actuated means operatively connected to said crankshaft for rotating said crankshaft; a plurality of pitmans operatively connected to said crankshaft; and means including a plurality of eccentric members for pivotally connecting said pitmans to said ram or blade adjacent to the front thereof.

19. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame; power actuated means operatively connected to said crankshaft for rotating said crankshaft; a plurality of pitmans operatively connected to said crankshaft; means including a plurality of eccentric members for pivotally connecting said pitmans to said ram or blade adjacent to the front thereof; and means for rotating said eccentric members for adjusting the front end of said ram or blade vertically relative to the upper rear edge of said bed.

20. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame; power actuated means operatively connected to said crankshaft for rotating said crankshaft; a plurality of pitmans operatively connected to said crankshaft and to said ram or blade adjacent to the front thereof for oscillating said ram or blade about said axis to cause a cutting edge of the shearing knife carried thereby to move across the cutting edge of the shearing knife carried by said bed; said pitmans being connected to said ram or blade by a plurality of eccentric bushings; and means for adjusting said eccentric bushings.

21. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame; power actuated means operatively connected to said crankshaft for rotating said crankshaft; a plurality of pitmans operatively connected to said crankshaft and to said ram or blade adjacent to the front thereof for oscillating said ram or blade about said axis to cause a cutting edge of the shearing knife carried thereby to move across the cutting edge of the shearing knife carried by said bed; said pitmans being connected to said ram or blade by a plurality of eccentric bushings carried by said pitmans; and means for adjusting said eccentric bushings.

22. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame; power actuated means operatively connected to said crankshaft for rotating said crankshaft; a plurality of pitmans operatively connected to said crankshaft and to said ram or blade adjacent to the front thereof for oscillating said ram or blade about said axis to cause a cutting edge of the shearing knife carried thereby to move across the cutting edge of the shearing knife carried by said bed; said pitmans being connected to said ram or blade by a plurality of eccentric bushings carried by said pitmans; and means for simultaneously adjusting said bushings.

23. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said side housings for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; power actuated means pivotally connected to said ram or blade adjacent to the front thereof for oscillating said ram or blade about said axis to cause a cutting edge of the shearing knife carried thereby to move across the cutting edge of the shearing knife carried by said bed; and means for counterbalancing the weight of said movable ram or blade.

24. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame; power actuated means operatively connected to said crankshaft for rotating said crankshaft; a plurality of pitmans operatively connected to said crankshaft and to said ram or blade adjacent to the front thereof for oscillating said ram or blade about said axis to cause a cutting edge of the shearing knife carried thereby to move across the cutting edge of the shearing knife carried by said bed; and compression spring means connected to said ram or blade adjacent to the front thereof for counterbalancing the weight thereof.

25. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; power actuated means operatively connected to said ram or blade adjacent to the front thereof for oscillating said ram or blade about said axis to cause a cutting edge of the shearing knife carried thereby to move across the cutting edge of the shearing knife carried by said bed; hold-down mechanism; and power actuated means for moving said hold-down mechanism toward said bed in timed relation to the movement of said ram or blade.

26. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame to the rear of and above the upper rear edge of said bed; power actuated means operatively connected to said crankshaft for rotating said crankshaft; a plurality of pitmans operatively connected to said crankshaft and to said ram or blade adjacent to the front end thereof for oscillating said ram or blade about said axis to cause a cutting edge of the shearing knife carried thereby to move across the cutting edge of the shearing knife carried by said bed; hold-down mechanism pivotally connected to said frame; and means operatively connected to said hold-down mechanism and to said crankshaft for moving said hold-down mechanism in timed relation to the oscillation of said movable ram or blade.

27. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its front rear edge; a movable ram or blade comprising a generally vertical plate-like member extending substantially the entire distance between said side housings, rearwardly projecting members and a member located behind said plate-like member all connected together; means for pivotally supporting said movable ram or blade in said frame for movement about an axis generally parallel with the upper rear edge of said bed and slightly above the plane of the work supporting surface thereof; said plate-like member having its lower front edge inclined with respect to said axis and adapted to have a shearing knife detachably fixed thereto; means operatively connected to said plate-like member and to said member located behind said plate-like member for moving said plate-like member relative to said thrust-resisting member whereby the lower front edge of said plate-like member can be substantially uniformly spaced from said axis; and power means connected to said ram or blade adjacent to the front thereof for oscillating said ram or blade about said axis.

28. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its front rear edge; a movable ram or blade comprising a generally vertical plate-like member extending substantially the entire distance between said side housings, rearwardly projecting members connected to said plate-like member and a thrust-resisting member located behind said plate-like member and connected to said rearwardly projecting members; means for pivotally supporting said movable ram or blade in said frame for movement about an axis generally parallel with the upper rear edge of said bed and slightly above the plane of the work supporting surface thereof; said plate-like member having its lower front edge inclined with respect to said axis and adapted to have a shearing knife detachably fixed thereto; a plurality of individually adjustable members operatively connected to said plate-like member and to said thrust-resisting member for moving said plate-like member relative to said thrust-resisting member whereby the lower front edge of said plate-like member can be substantially uniformly spaced from said axis; and power means connected to said ram or blade adjacent to the front thereof for oscillating said ram or blade about said axis.

29. In a power operated, heavy duty, metal shears of the character referred to, the combination of: a frame comprising horizontally spaced, generally vertical side housings and a bed; said bed comprising a vertical stress resisting plate-like member fixed to said side housings, a generally horizontal stress resisting plate-like member located in front of said vertical plate-like member and connected thereto along the upper edge thereof and a rearwardly projecting, downwardly inclined, stress resisting plate-like member located behind said vertical plate-like member and welded thereto adjacent to the upper edge thereof and to said side housings; said vertical plate-like member being adapted to have a shearing blade detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper edge of said bed and slightly above the plane of the work supporting surface thereof; said movable ram or blade having its lower edge inclined with respect to said axis and uniformly paced therefrom and adapted to have a shearing knife detachably connected thereto; and power actuated means pivotally connected to said ram or blade adjacent to the front thereof for oscillating said ram or blade about said axis to cause a cutting edge of the shearing knife carried thereby to move across the cutting edge of the shearing knife carried by said bed.

30. In a power operated, heavy duty, metal shears of the character referred to, the combination of: a frame comprising horizontally spaced, generally vertical side housings and a bed having a generally horizontal surface adapted to support material or work to be sheared connected to said side housings adjacent to the front thereof; said bed being adapted to have a shearing knife detachably connected thereto adjacent to its upper rear edge; a movable ram or blade intermediate said side housings and extending substantially the entire distance therebetween; means for pivotally supporting said movable ram or blade in said frame for movement about an axis generally parallel with the upper rear edge of said bed and slightly above the plane of the work supporting surface thereof; said movable ram or blade having its lower front edge inclined with respect to said axis and uniformly spaced therefrom and adapted to have a shearing knife detachably attached thereto; a crankshaft rotatably supported in said frame; power actuated means including a friction clutch for rotating said crankshaft; and a plurality of pitmans operatively connected to said crankshaft and to said ram or blade adjacent to the front thereof for oscillating said ram or blade about said axis to cause a cutting edge of the shearing knife carried thereby to move across the cutting edge of the shearing knife carried by said bed.

WILLIAM G. WEHR.